United States Patent
Lee et al.

(10) Patent No.: US 7,821,286 B2
(45) Date of Patent: Oct. 26, 2010

(54) TESTING DEVICE FOR PERFORMING A TEST ON A LIQUID CRYSTAL DISPLAY AND A METHOD OF DRIVING THE TESTING DEVICE

(75) Inventors: Ki-young Lee, Gunsan-si (KR); Nam-soo Kang, Asan-si (KR); Ki-hyun Hong, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 161 days.

(21) Appl. No.: 12/171,712

(22) Filed: Jul. 11, 2008

(65) Prior Publication Data

US 2009/0160478 A1 Jun. 25, 2009

(30) Foreign Application Priority Data

Dec. 21, 2007 (KR) .................. 10-2007-0135345

(51) Int. Cl.
 *G01R 31/02* (2006.01)
(52) U.S. Cl. .................. 324/770; 324/158.1
(58) Field of Classification Search .................. None
 See application file for complete search history.

(56) References Cited

U.S. PATENT DOCUMENTS

2007/0200589 A1* 8/2007 Jeong et al. .................. 324/770
2008/0150856 A1* 6/2008 Nam .......................... 345/87

* cited by examiner

*Primary Examiner*—Vinh P Nguyen
(74) *Attorney, Agent, or Firm*—F. Chau & Associates, LLC

(57) ABSTRACT

A testing device for performing a high-voltage test on a liquid crystal display is provided. The testing device includes a voltage converting unit, an input connector, and a power supplier. The voltage converting unit includes a plurality of resistors between an output terminal and a ground terminal. The input connector includes a terminal connected to one node of the plurality of resistors. The power supplier includes a switching unit to output a ground voltage to the terminal when power is applied from an external power source.

20 Claims, 4 Drawing Sheets

TESTING DEVICE FOR PERFORMING A TEST ON A LIQUID CRYSTAL DISPLAY AND A METHOD OF DRIVING THE TESTING DEVICE

CROSS-REFERENCE TO RELATED APPLICATIONS

This application claims priority to Korean Patent Application No. 10-2007-00135345, filed on Dec. 21, 2007 in the Korean Intellectual Property Office, the disclosure of which is incorporated by reference herein.

BACKGROUND OF INVENTION

1. Technical Field

The present disclosure relates to a testing device for performing a high voltage test on a liquid crystal display and a method of driving the testing device.

2. Discussion of Related Art

A liquid crystal display (LCD) includes two display substrates and a liquid crystal layer disposed therebetween. A pixel electrode and a common electrode are formed on the substrates. The liquid crystal layer has a dielectric anisotropy. The LCD includes a gate driver, a data driver, and a DC-DC converter. The gate driver outputs a gate signal including a gate-on voltage and a gate-off voltage. The data driver outputs a data signal. The DC-DC converter converts external power into supply power for the gate driver and data driver.

The LCD may be inspected for defects during the manufacturing process. For example, a high-voltage stress (HVS) test may be performed on the LCD and then the LCD can be inspected for defects due to the application of the high voltage. A predetermined voltage that is higher than a voltage that the LCD is rated to operate with is applied to the LCD during the HVS test. The HVS test may also be performed on the LCD while the LCD is subjected to various degrees of temperature and humidity.

However, a separate testing device is needed to generate a high voltage to perform the HVS test. Further, a connector to connect the testing device to the LCD is needed. Consequently, the testing device and connector increase the costs of manufacturing the LCD.

Thus, there is a need for a testing device that can reduce the costs of manufacturing an LCD.

SUMMARY OF INVENTION

An exemplary embodiment of the present invention provides a testing device for performing a test on a liquid crystal display. The testing device includes a voltage converting unit, an input connector, and a power supplier. The voltage converting unit includes a plurality of resistors between an output terminal and a ground terminal. The input connector includes a terminal connected to one node of the plurality of resistors. The power supplier includes a switching unit to output a ground voltage to the terminal when power is applied from an external power source.

The switching unit may be an analog switch. The voltage converting unit may be a DC/DC converter. The power supplier may further include a supply connector configured to be connected to the external power source and for transferring the power from the external power source to the switching unit. The power supplier may further include a contact connector configured to be connected to the input connector and for transferring a ground voltage through the terminal of the input connector to the node of the plurality of resistors.

The plurality of resistors may include a first resistor, a second resistor, and a third resistor, and the terminal is connected to a node between the second resistor and the third resistor. The first end of the first resistor may be connected to the output terminal and the second end of the first resistor may be connected to the first end of the second resistor. The first end of the third resistor may be connected to the second end of the second resistor and the second end of the third resistor may be connected to the ground terminal.

The voltage converter may apply a feedback voltage across a node between the first and second resisters. The input connector may be a 40 pin connector and the supply connector may be a 30 pin connector.

An exemplary embodiment of the present invention provides a liquid crystal display (LCD). The LCD includes an LCD panel, a data driver, a gate driver, a voltage converting unit, and an input connector. The LCD panel includes a plurality of data and gate lines. The data driver outputs a data signal to the data lines. The gate driver outputs a gate signal to the gate lines. The voltage converting unit supplies a gate-on and a gate-off voltage to the gate driver. The voltage converting unit includes a plurality of resistors between an output terminal and a ground terminal. The input connector includes a terminal. One end of the terminal is connected to one node of the plurality of resistors and the other end of the terminal is configured to receive a ground voltage from an external power source.

An exemplary embodiment of the present invention provides a method for driving a testing device to perform a high-voltage on a liquid crystal display (LCD). The LCD includes a voltage converting unit and an input connector. The voltage converting unit includes a plurality of resistors between an output terminal and a ground terminal. The input connector includes a terminal connected to one node of the plurality of resistors. The method includes the steps of inputting power to a switching unit of the testing device, and outputting a ground voltage from the switching unit through the terminal to the node of the plurality of resistors. The method may further include applying a feedback voltage in the voltage converter across a node between the first and second resisters.

BRIEF DESCRIPTION OF THE DRAWINGS

The present invention will become apparent by describing in detail exemplary embodiments thereof, with reference to the accompanying drawings, in which.

DETAILED DESCRIPTION OF EXEMPLARY EMBODIMENTS

Figure 1:
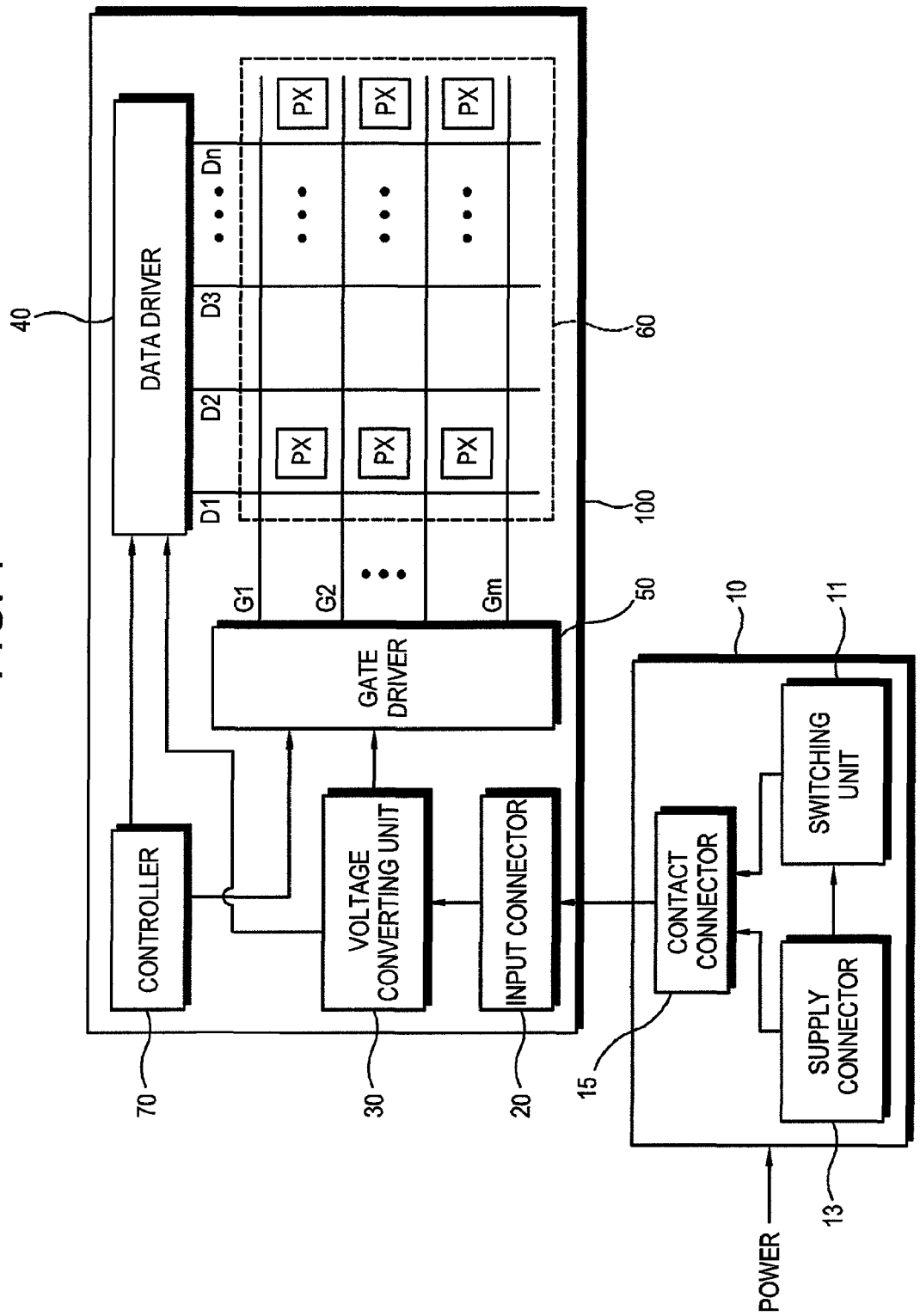
FIG. 1 illustrates an LCD and a testing device according to an exemplary embodiment of the present invention.

Hereinafter, exemplary embodiments of the present invention will now be described more fully with reference to the accompanying drawings. Like reference numerals may refer to like elements throughout.

FIG. 1 illustrates an LCD and a testing device according to an exemplary embodiment of the present invention. The LCD 100 includes an input connector 20, a voltage converting unit 30, a gate driver 50, a data driver 40, an LCD panel 60, and a controller 70. A power supplier 10 may be disposed outside the LCD 100 and supply power from an external source as an input voltage to drive the LCD 100. The power supplier 10 includes a supply connector 13, a contact connector 15, and a switching unit 11. The testing device may include the voltage converting unit 30, the input connector 20, and the power supplier 10.

The LCD panel 60 includes a plurality of pixels (PX) arranged in a matrix form in a display region (A) where an image is displayed. The LCD panel 60 includes lower and upper substrates facing each other and a liquid crystal layer interposed therebetween. The LCD panel 60 may further include a plurality of light emitting elements emitting different colors of light to the liquid crystal layer. The light emitting elements may include light emitting diode (LED), a lamp, etc.

The LCD panel 60 is connected with the data driver 40 and gate driver 50 through signal lines (G1-Gm, D1-Dn). The signal lines (G1-Gm, D1-Dn) include a plurality of gate lines (G1-Gm) to transmit a gate signal and a plurality of data lines (D1-Dn) to transmit a data signal. The gate lines (G1-Gm) extend in the row direction and are substantially parallel with each other, and the data lines (D1-Dn) extend in the column direction and are substantially parallel with each other. An image is displayed in the display region (A) based on a data signal applied from the data driver 40 and a gate signal applied from the gate driver 50.

The gate driver 50 is connected with the gate lines (G1-Gm) on the LCD panel 60. The gate driver 50 is supplied with a gate-on voltage (Von) and gate-off voltage (Voff) from the voltage converting unit 30. The gate driver 50 supplies a gate signal derived from the gate-on voltage (Von) and the gate-off voltage (Voff) to the gate lines (G1-Gm).

The data driver 40 is connected to the data lines (D1-Dn) on the LCD panel 60 to apply a data signal. A data signal may include a grayscale voltage which can be varied to adjust a brightness level of each pixel according to an image signal supplied from an external source. The data driver 40 receives an image signal for pixels in one row according to a control signal from the controller 70. The data driver 40 selects a grayscale voltage corresponding to each image and converts it into a data signal to apply to the data lines (D1-Dn).

The controller 70 controls the LCD panel 60 to display an image corresponding to an image signal input from an external source. The controller 70 may be a timing controller. The controller 70 may receive an image signal (R, G, and B) from an external graphic controller (not shown) and a control signal to control it such as a synchronization signal, a clock signal, etc. The controller 70 may generate a gate control signal, data control signal, or other similar signals to display an image signal on the LCD panel 60 on based on the control signal. The controller 70 outputs the gate control signal to the gate driver 50 and the data control signal to the data driver 40.

The gate driver 50 and data driver 40 may be formed on a circuit board connected to the LCD panel 60. Alternately, the gate driver 50 and data driver 40 may be included in the controller 70.

The input connector 20 is supplied with an input voltage from the power supplier 10 for output to the voltage converting unit 30. The input connector 20 connects to the power supplier 10. The input connector 20 may include a 40 pin connector. The input connector 20 may include a dummy terminal (e.g., pin 37) which is not used in a conventional LCD. The dummy terminal (37 pin) may be connected to the voltage converting unit 30 through a lead wire.

The voltage converting unit 30 converts input voltage applied from the input connector 20 into a driving voltage, a gate-on voltage (Von), and gate-off voltage (Voff). The voltage converting unit 30 may include a DC-DC converter having a plurality of resistors connected in series between an output terminal and a ground terminal. One node of the resistors of the voltage converting unit 30 is connected to the dummy terminal of the input connector 20.

Figure 3:
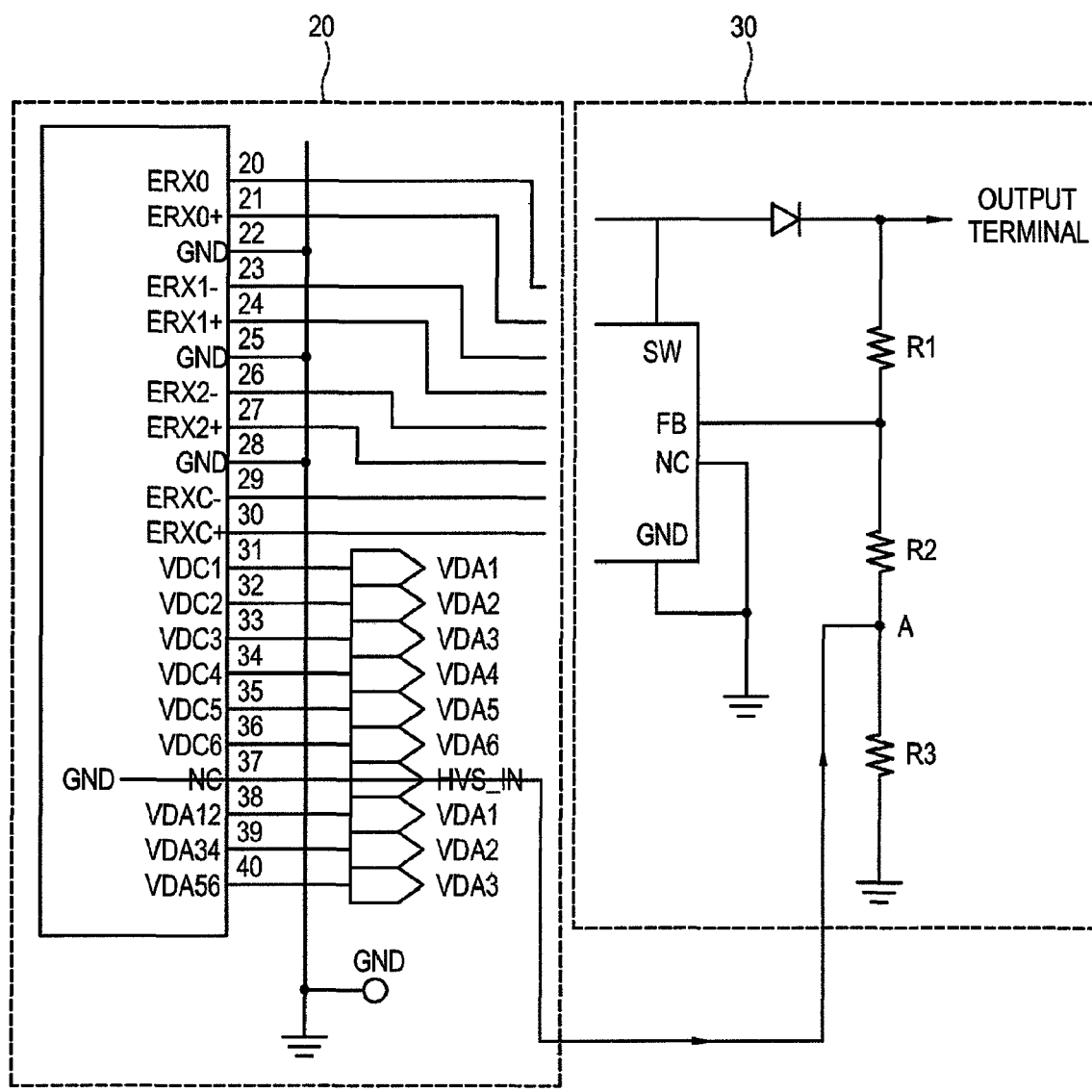
FIG. 3 illustrates an input connector and a voltage converting unit according to an exemplary embodiment of the present invention.

Referring to FIG. 3, the voltage converting unit 30 includes a first resistor (R1), a second resistor (R2), and a third resistor (R3) in series. The voltage converting unit 30 adjusts an output voltage using a feedback voltage FB across the second resistor (R2).

One node of the voltage converting unit 30 is connected to the dummy terminal (e.g., pin 37) of the input connector 20. FIG. 3 illustrates an embodiment of the input connector 20 where pin 37 is the dummy terminal. A node A between the second resistor (R2) and the third resistor (R2) is connected to the dummy terminal.

The supply connector 13 is supplied with power from an external source. The supply connector 13 may be a 30 pin connector. Power input through the supply connector 13 is supplied to the input connector 20 via the contact connector 15. The contact connector 15 is connected to the input connector 20 and transmits an input ground voltage from the switching unit 11 to the input connector 20. Input voltage supplied to the input connector 20 is converted by the voltage converting unit 30 into a driving voltage, gate-on voltage (Von"), and gate-off voltage (Voff).

A conventional LCD further includes an HVS connector (not shown) that is supplied with a high voltage from an external source for a HVS test. However, a display device according to at least one embodiment of the present invention does not need to include an HVS connector and includes a switching unit 11 in a power supplier 10 instead of a HVS connector and a high-voltage supplier.

Figure 2:
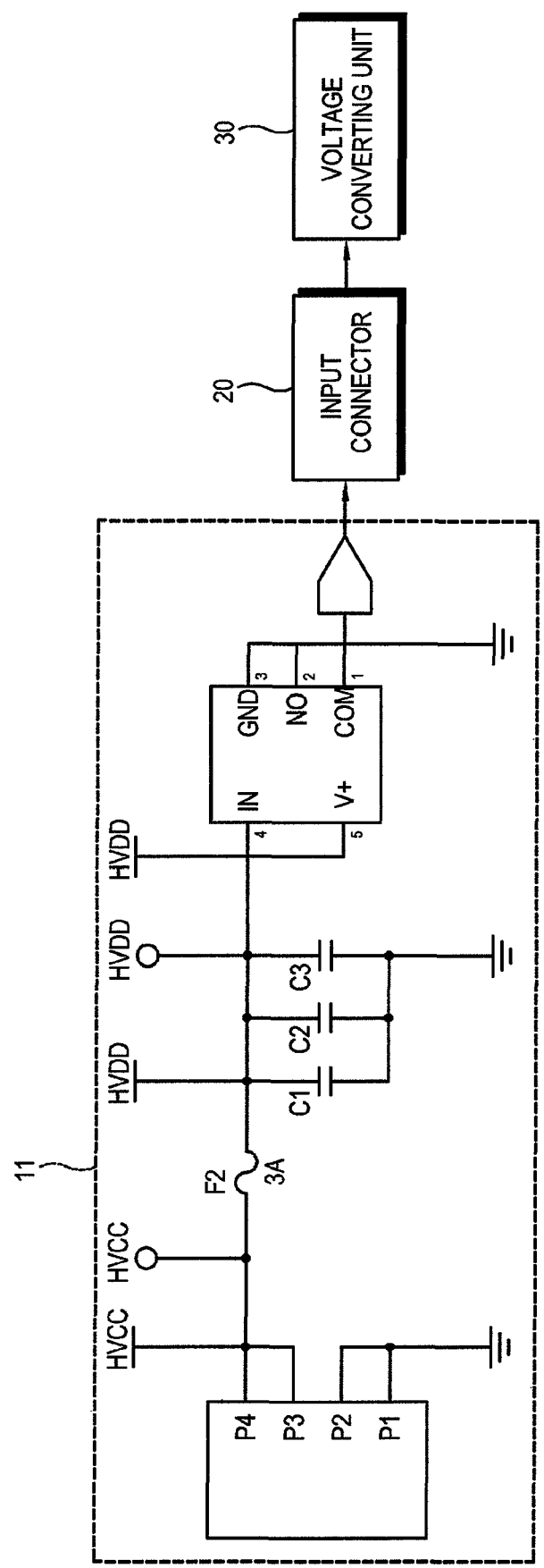
FIG. 2 illustrates a switching unit according to an exemplary embodiment of the present invention.

The switching unit 11 may include an analog switch which outputs a ground voltage (GND) when input with power from an external source. The Ground voltage (GND) is supplied to the voltage converting unit 30 through the dummy terminal (e.g. pin 37) of the input connector 20. The voltage converting unit 30 outputs a high voltage which has been boosted to a predetermined level. With reference to FIG. 2, power input from an external source is input to IN (e.g., pin 4) of the switching unit 11. When the power is input to IN, the ground voltage (GND) is output through COM (e.g., pin 1).

The ground voltage (GND) output from the switching unit 11 is supplied to the node A of the voltage converting unit 30 through the dummy terminal (e.g., pin 37). When the ground voltage (GND) is not supplied to the node A, an input voltage is distributed to the first resistor (R1), second resistor (R2), and third resistor (R3) to output a driving voltage with a predetermined level.

When the ground voltage (GND) is supplied to the node A, an upper terminal of the third resistor (R3) has a ground voltage (GND). Accordingly, input voltage is distributed to the first resistor (R1) and the second resistor (R2). Consequently, a driving voltage with a higher level than when input voltage is distributed to the first to third resistors (R1-R3) is output to the output terminal.

The LCD 100 may be tested by an HVS test by supplying a high voltage output from the voltage converting unit 30.

Thus, a HVS test may be carried out without an HVS connector and a high-voltage supplier that supplies a high voltage. Further, as a separate circuit to supply a high voltage is not necessary, a cost for the testing of the LCD 100 may be reduced.

A method of driving a testing device to perform an HVS test on the LCD 100 according to an exemplary embodiment of the present invention will be explained with reference to FIG. 4. The LCD 100 may be inspected after the HVS test is applied to the LCD during manufacturing.

Figure 4:
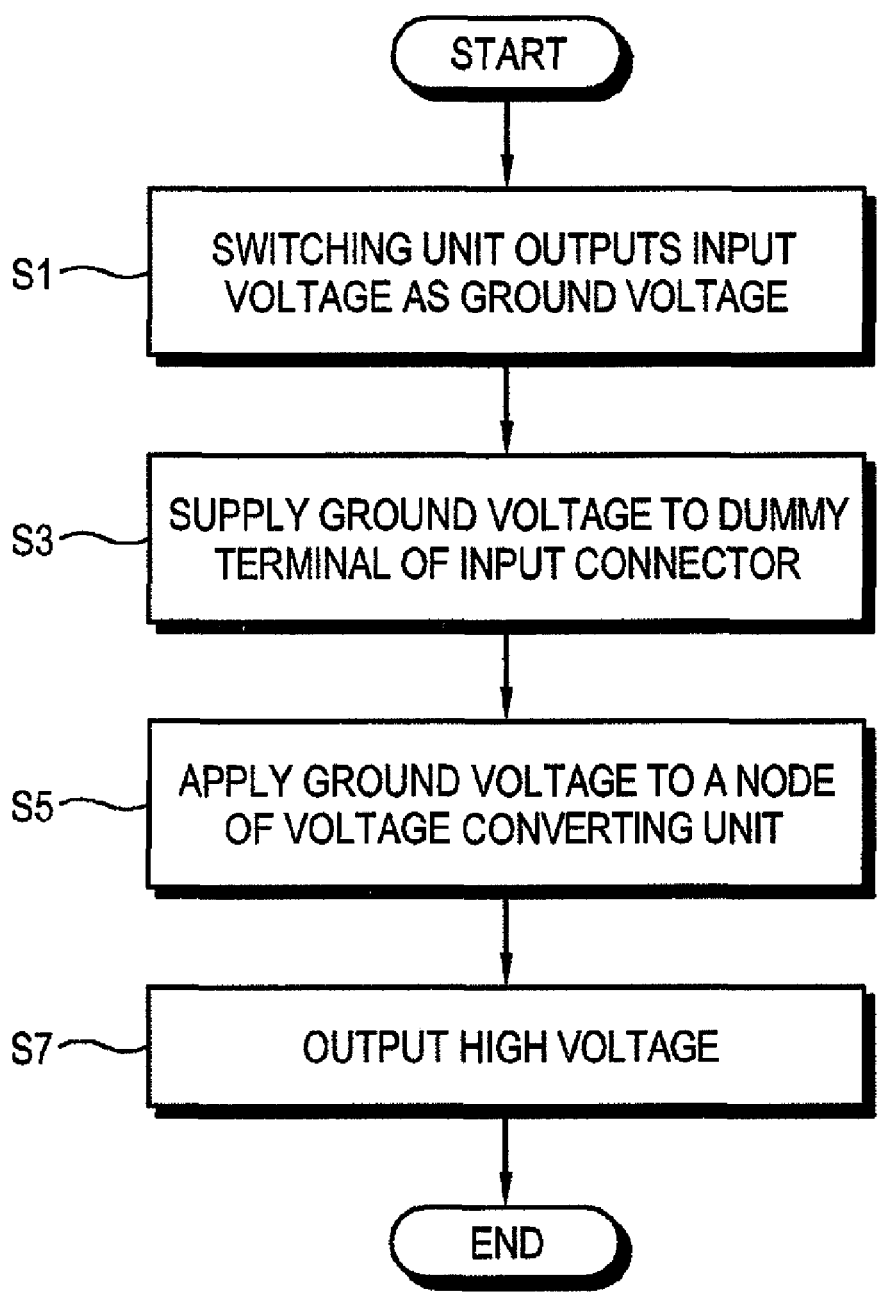
FIG. 4 is a control flowchart to describe a method of driving the testing device to perform a high-voltage test on the LCD according to an exemplary embodiment of the present invention.

Referring to FIG. 4, the switching unit 11 outputs a ground voltage (GND) when supplied with power from an external source (S1).

As described above, the switching unit 11 is connected to the dummy terminal (e.g., pin 37) of the input connector 20 and the node A of the voltage converting unit 30.

Thus, the output ground voltage (GND) is supplied to the dummy terminal (e.g., pin 37) of the input connector 20 (S3).

Then, the ground voltage (GND) is applied to the node A of the voltage converting unit 30 (S5).

When the ground voltage (GND) is applied to the voltage converting unit 30, input voltage is not distributed to the resistor (R3) in the voltage converting unit 30. Accordingly, the voltage converting unit 30 converts input voltage into high voltage through the resistor not supplied with the ground voltage (GND) (S7).

Thus, a HVS test may be carried out without an HVS connector and a high-voltage supplier to supply a high voltage. Further, as a separate circuit to supply a high voltage is not necessary, a manufacturing cost of the LCD 100 may be reduced.

As described above, at least one embodiment of the present invention includes a testing device for a display device which does not need a connector circuit to perform a HVS test and a high-voltage supplier to supply a high voltage.

Although exemplary embodiments of the present invention have been shown and described, it will be apparent to those skilled in the art that many variations and modifications may be made in these embodiments without substantially departing from the scope and spirit of the invention.

What is claimed is:

1. A testing device for generating a high voltage stress test on a liquid crystal display (LCD), the testing device comprising:
    a voltage converting unit including a plurality of resistors between an output terminal and a ground terminal;
    an input connector including an input terminal, wherein one end of the input terminal is connected to one node of the plurality of resistors; and
    a power supplier including a switching unit,
    wherein the switching unit outputs a ground voltage to the input terminal when power is applied from an external power source, and then the output terminal of the voltage converting unit outputs a high-voltage stress (HVS) test on the LCD.

2. The testing device according to claim 1, wherein the switching unit is an analog switch.

3. The testing device according to claim 1, wherein the voltage converting unit is a DC/DC converter.

4. The testing device according to claim 1, wherein the power supplier further comprises a supply connector configured to be connected to the external power source and for transferring the power from the external power source to the switching unit.

5. The testing device according to claim 1, wherein the power supplier further comprises a contact connector configured to be connected to the input connector and for transferring the ground voltage through the terminal of the input connector to the node of the plurality of resistors.

6. The testing device according to claim 1, wherein the plurality of resistors comprises a first resistor, a second resistor, and a third resistor, and the terminal is connected to a node between the second resistor and the third resistor.

7. The testing device according to claim 6, wherein the first end of the first resistor is connected to the output terminal and the second end of the first resistor is connected to the first end of the second resistor, and wherein the first end of the third resistor is connected to the second end of the second resistor and the second end of the third resistor is connected to the ground terminal.

8. The testing device according to claim 7, wherein the voltage converter applies a feedback voltage across a node between the first and second resisters.

9. The testing device according to claim 1, wherein the input connector is a 40 pin connector.

10. The testing device according to claim 4, wherein the supply connector is a 30 pin connector.

11. A liquid crystal display (LCD) comprising:
    a LCD panel having a plurality of data and gate lines;
    a data driver outputting a data signal to the data lines;
    a gate driver outputting a gate signal to the gate lines;
    a voltage converting unit supplying a gate-on and gate-off voltage to the gate driver and including a plurality of resistors between an output terminal and a ground terminal; and
    an input connector including a terminal, wherein one end of the terminal is connected to one node of the plurality of resistors and the other end of the terminal is configured to receive a ground voltage from an external power source.

12. The LCD according to claim 11, wherein the voltage converting unit is a DC/DC converter.

13. The LCD according to claim 11, wherein the plurality of resistors comprises a first resistor, a second resistor, and a third resistor, and the terminal is connected to a node between the second resistor and the third resistor.

14. The LCD according to claim 13, wherein the first end of the first resistor is connected to the output terminal and the second end of the first resistor is connected to the first end of the second resistor, and wherein the first end of the third resistor is connected to the second end of the second resistor and the second end of the third resistor is connected to the ground terminal.

15. The LCD according to claim 14, wherein the voltage converter applies a feedback voltage across a node between the first and second resisters.

16. The LCD according to claim 11, wherein the input connector is a 40 pin connector.

17. A method of driving a testing device to provide a high-voltage stress (HVS) test on a liquid crystal display (LCD), the method comprising:
    inputting power to a switching unit of a power supplier, wherein the testing device further includes an input connector and a voltage converting unit;
    outputting a ground voltage from the switching unit through an input terminal of the input connector to a node of a plurality of resistors of the voltage converting unit between an output terminal and a ground terminal; and
    outputting a high-voltage from the output terminal of the voltage converting unit to perform the high-voltage stress (HVS) test on the LCD.

18. The method according to claim 17, wherein the plurality of resistors comprises a first resistor, a second resistor, and a third resistor, and the terminal is connected to a node between the second resistor and the third resistor.

19. The method according to claim 18, wherein the first end of the first resistor is connected to the output terminal and the second end of the first resistor is connected to the first end of the second resistor, and wherein the first end of the third resistor is connected to the second end of the second resistor and the second end of the third resistor is connected to the ground terminal.

20. The method according to claim 19 further comprises applying a feedback voltage in the voltage converter across a node between the first and second resisters.

* * * * *